United States Patent Office 3,515,745
Patented June 2, 1970

3,515,745
SYNTHESIS OF ARYLAMINO METHYLENEMALONATES
Roger J. Tull, Metuchen, Leonard M. Weinstock, Rocky Hill, and Dennis M. Mulvey, Iselin, N.J., assignors to Merck & Co., Inc., Rahway, N.J., a corporation of New Jersey
No Drawing. Filed Oct. 5, 1967, Ser. No. 672,996
Int. Cl. C07c *101/44*
U.S. Cl. 260—471          6 Claims

ABSTRACT OF THE DISCLOSURE

Diloweralkyl alkoxymethylenemalonates are prepared by reaction of a diloweralkyl hydroxymethylenemalonate or a salt thereof with a loweralkanol in the presence of acid.

Arylaminomethylenemalonic esters are prepared by the reaction of a substituted aniline compound with diloweralkyl hydroxymethylenemalonate or a salt thereof in a loweralkanolic solvent medium and in the presence of acid.

BACKGROUND OF THE INVENTION

This invention pertains to a novel method for preparing arylamino methylenemalonic esters of the general structure

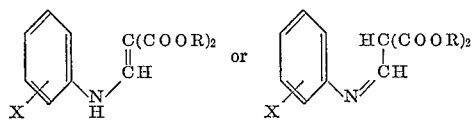

where R represents loweralkyl and X represents one or more nuclear substituents.

Arylamino methylenemalonic esters of the above type are useful intermediates in the synthesis of 4-hydroxyquinoline-3-carboxylates, as described in U.S. Pat. Nos. 2,614,121 (Price et al.) and 3,267,106 (Watson) and by Riegel et al., J. Am. Chem. Soc. 68, 1264 (1946). In the method generally employed heretofore the arylaminomethylenemalonic esters are prepared from the appropriate aniline derivative and a loweralkyl alkoxymethylenemalonate such as methyl methoxymethylenemalonate or ethyl ethoxymethylenemalonate. Although this reaction is itself a satisfactory one, the need for beginning with the loweralkyl alkoxymethylenemalonate is a serious drawback because this ester is difficult and expensive to prepare by prior art methods with the result that the ester itself is costly and not readily available in large quantities. The present invention obviates these difficulties because it provides a convenient and reasonable process for making loweralkyl alkoxymethylene malonates, and further provides a method for preparing the arylamino methylenemalonic esters directly from hydroxymethylenemalonates without isolation of alkoxymethylenmalonate.

In summary, the present invention comprises the synthesis of loweralkyl alkoxymethylenemalonates from loweralkyl hydroxymethylenemalonates or salts thereof by treatment of the latter substances with a loweralkanol in the presence of a strong acid. In addition, it comprises the synthesis of arylaminomethylenemalonates by reaction of a substituted aniline with loweralkyl hydroxymethylenemalonate or a salt thereof in a loweralkanol in the presence of a strong acid. Other objects, purposes and details of the invention will be evident from the following discussion.

The processes of this invention may be pictured structurally as

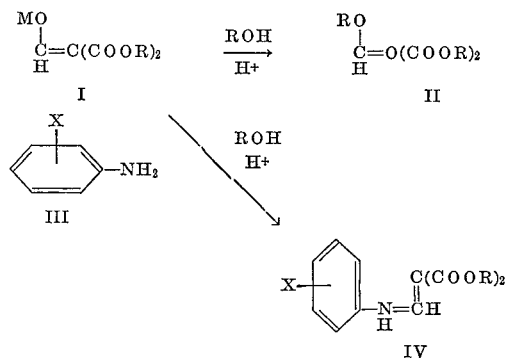

where M is hydrogen or an alkali metal, R is loweralkyl, and X represents one or more nuclear substituents in the benzene ring. More particularly, M may be hydrogen or an alkali metal such as sodium or potassium. When M represents a metal, additional acid is employed in the reaction in order to neutralize the salt, so that the reacting species is actually the loweralkyl hydroxymethylenemalonate (I, M=H). R is a loweralkyl radical, and preferably one of 1–5 carbon atoms such as methyl, ethyl, propyl or amyl. In order to avoid side reactions such as ester interchange, it is preferred that the R radicals be the same, although this is not essential to the process.

The symbol X denotes one or more nuclear substituents, which may be the same or different in any specific compound. The nature of these substituents is not critical, although for best results they should be ones that will not react with the malonate compound, i.e. it is preferred that X not represent amino. Examples of X are alkoxy, aralkoxy, aryloxy, alkyl, aralkyl, dialkylamino, haloalkoxy, halogen, nitro and hydroxy. When more than one nuclear substituent is present, they may be the same or different. Representative of the aniline compounds (III) which are suitable for reaction with the oxymethylenemalonate (I) are 3,4-dibutoxy-aniline, 3,4-diisobutoxy-aniline, 3,4-dimethoxy-aniline, 3-ethoxy-4-decyloxy-aniline, 3-benzyloxy - 4 - methoxy-aniline, 3-allyloxy-4-propoxy-aniline, 3-benzyloxy-aniline, 6,7-diisopropoxy-aniline, 3-ethoxy - 4-ethyl-aniline, 3-benzyloxy-4-n-butyl-aniline, 3-ethyl - 4-propoxy-aniline, 3-butyl-4-butoxy-aniline, 3-i-propoxy - 4-propyl-aniline, 3,4-bis-diethylamino-aniline, 3,4-bis-di-n-propylamino-aniline, 3-diethylamino-4-n-propylaniline, 3-diethylamino - 4-ethyl-aniline, 3-di-n-propylamino - 4-ethyl-aniline, 3-n-propyl - 4-diethylamino-aniline, 3-butyl - 4-diethylamino-aniline, 3-butoxy-4-dipropylamino-aniline, 3-chloro-aniline, 3-bromo-aniline and 3-chloro-4-propyl-aniline. These, on reaction with the methoxymethylenemalonate (II) afford the corresponding substituted arylamino methylene-malonic ester (IV).

The first aspect of the invention comprises synthesis of loweralkyl alkoxymethylenemalonate (II) from loweralkyl hydroxymethylenemalonate (I) or a salt thereof.

In a neutral lower alkanol, such as methanol, loweralkyl hydroxymethylenemalonate is unstable. After a short period of time substantial quantities of malonate ester and formate ester are produced. It has now been found, however, that if excess acid is present this decomposition does not occur, but rather that loweralkyl alkoxymethylenemalonate is produced after a short period of time. On treatment of the hydroxymethylene compound I with alkanolic acid, its typical ultra-violet absorption peak disappears very quickly and the alkoxymethylenemalonate is subsequently formed. Although we do not wish to be bound by this theroretical explanation, it is believed that the first and immediate reaction is conversion of the starting material to a hemiacetal:

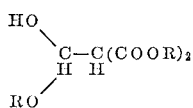

which is then dehydrated by the strong acid to the alkoxymethylenemalonate II.

The reaction may be carried out in any lower alkanol such as methanol, ethanol, isopropanol or butanol, but methanol or ethanol are preferred. As the acid it is preferred to use hydrogen chloride, although other strong mineral acids such as hydrogen bromide, sulfuric acid and phosphoric acid may also be used. Formation of the loweralkyl alkoxymethylene malonate proceeds well at room temperature, where yields of over 90% are obtained in from 2–8 hours, but higher reaction temperatures of up to about 80° C. may be used if desired.

It is important to have present at least a slight excess of acid over that required to neutralize the starting material. A molar excess of about 5–75% is normally employed for best results. When the methoxymethylenemalonate salt, such as the sodium or potassium salt, is the starting material, the quantity of excess acid used is over and above the equimolar molar amount of acid required to neutralize the salt. The methoxymethylenemalonate thus obtained may be recovered by addition of water and extraction into a water-immiscible organic solvent such as diethyl ether. Removal of the ether affords substantially pure diloweralkyl alkoxymethylenemalonate in yields of greater than 80% of theory. The diloweralkyl alkoxymethylenemalonate thus obtained may be reacted with an aniline compound of Formula III above by methods known in the art to afford arylaminomethylenemalonates of Formula IV. In this way there are obtained substances such as dimethyl methoxymethylenemalonate, diethyl ethoxymethylenemalonate and dipropyl propoxymethylenemalonate.

In accordance with a second and preferred aspect of this invention, arylamino methylenemalonic esters of Formula IV are obtained by the reaction of the substituted aniline III and dialkyl hydroxymethylene malonate or a salt thereof (I). This process is brought about in a lower alkanol solvent medium, preferably in the presence of excess acid. Although some of the desired arylamino methylenemalonic ester is produced when the aniline is reacted with diloweralkyl hydroxymethylenemalonate in the absence of acid, the reaction is slow and affords only relatively low yields of desired product. Although this reaction is new and generally encompassed within the scope of this invention, best results are obtained when the process is brought about in the presence of some excess acid and this is a preferred embodiment of the invention. It is desirable to use an excess of acid over that required to neutralize the aniline compound and over that necessary to neutralize the salt of diloweralkyl hydroxymethylenemalonate. In other words, there should for best results be some free acid in the reaction mixture, which amount is preferably from about a 5–75% molar excess. Under these preferred conditions yields of desired product in excess of 85% are obtained.

The reaction proceeds well at temperatures of from about 20–40° C., although higher temperatures of up to about 80° C. may be used if desired. At room temperature the desired formation of arylamino methylenemalonic ester is substantially complete in relatively short periods of time, i.e. from 2–20 hours, although these times are shortened at higher reaction temperatures.

As solvent there is used a lower alkanol such as methanol, ethanol, propanol or butanol. It is preferred that the solvent be the lower alkanol corresponding to the particular loweralkyl malonate reactant since this eliminates the possibility of ester interchange.

The nature of the particular acid is not critical. It is preferred to employ a strong mineral acid such as hydrochloric, hydrobromic or sulfuric acid, but others such as glacial acetic acid may also be employed.

It is believed that the process proceeds by way of the initial formation of diloweralkyl alkoxymethylenemalonate from diloweralkyl hydroxymethylenemalonate (or a salt thereof), and reaction of the alkoxymethylene compound with the substituted aniline. However, the alkoxymethylenemalonate is not recovered or isolated, and the overall, practical effect is synthesis of the arylamino methylenemalonic ester from diloweralkyl hydroxymethylenemalonate (or salt thereof).

As previously stated, the nature of the substituent or substituents in the aniline reactant are not critical to the process of our invention as long as they are non-reactive with the malonate. Representative examples of arylamino methylenemalonic esters made in this way are those obtained by treating the previously mentioned aniline derivatives with dimethyl hydroxymethylenemalonate, dimethyl hydroxymethylenemalonate sodium salt, diethyl hydroxymethylenemalonate, diethyl hydroxymethylenemalonate potassium salt, or dipropyl hydroxymethylenemalonate.

The arylamino methylenemalonic esters are conveniently recovered by neutralization of excess acid with a base, removal of the reaction solvent and extraction into an organic solvent such as benzene, toluene or xylene. Removal of the organic solvent affords the desired products, generally as oils.

The arylamino methylenemalonic esters obtained in this way are converted to loweralkyl-4-hydroxy-quinoline-3-carboxylates substituted at the 6- and/or 7-positions by heating at elevated temperatures of about 270° C. in an oxygen-free environment, or as described in the literature. Certain of the quinolates thus obtained are known compounds, while others not previously reported such as the quinolates having 6- and/or 7-alkyl or dialkylamino substituents are useful as anticoccidial agents for poultry, for which purpose they are administered to poultry as an element of the feed at levels of about 0.003% by weight of the feed.

The following examples are given for the purpose of illustration and not by way of limitation.

EXAMPLE 1

(A) A solution of 4.12 g. of 3 - diethylamino - 4 - n-propylaniline (20 mmole) in 21.3 ml. of 2.35 N methanolic hydrogen chloride (50 mmole) at 20° C. is treated with 4.0 g. of well ground dimethyl hydroxymethylenemalonate sodium satl (22 mmole). The mixture is stirred for 16 hours at 20–25° C. and treated with a solution of 1.49 g. of sodium carbonate in 20 ml. of water to bring the pH to 6–7. The methanol is then evaporated in vacuo and the remaining oil is extracted with 1× 25 and 1× 10 ml. of benzene. The benzene extracts are combined, dried over magnesium sulfate and evaporated to a thick oily residue which is degassed under 1 mm. pressure. There is obtained 7.19 g. of oil consisting essentially of methyl α-carbomethoxy-β-(3-diethylamino - 4-n-propyl-anilino)-acrylate.

(B) The total product is rinsed with 7 ml. of dodecylbenzene and warmed to 50° C. This solution is added over a one minute period to 270 ml. of stirred dodecylbenzene preheated to 268° C. and under a nitrogen purge in a quartz flask. After the addition the mixture is heated at 267–269° C. for 4 minutes and then cooled to 80° C. with an ice bath. 50 ml. of acetone is added and the gel is allowed to crystallize at 60° C. After the gel is fully digested the mixture is cooled to 5° C., the solid product filtered and washed three times with acetone. It is dried in vacuo at 50° C. to give 5.4 g. of methyl 4-hydroxy-6-n-propyl-7 - diethylamino - quinoline - 3-carboxylate, M.P. 206–209° C.

EXAMPLE 2

When the process of Example 1A is repeated using the aniline derivatives set forth below as starting material, the corresponding methyl arylamino methylenemalonates are obtained

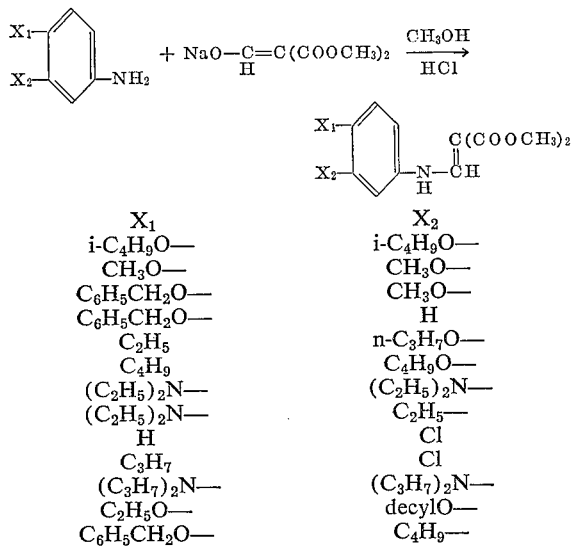

| $X_1$ | $X_2$ |
|---|---|
| i-$C_4H_9O$— | i-$C_4H_9O$— |
| $CH_3O$— | $CH_3O$— |
| $C_6H_5CH_2O$— | $CH_3O$— |
| $C_6H_5CH_2O$— | H |
| $C_2H_5$ | n-$C_3H_7O$— |
| $C_4H_9$ | $C_4H_9O$— |
| $(C_2H_5)_2N$— | $(C_2H_5)_2N$— |
| $(C_2H_5)_2N$— | $C_2H_5$— |
| H | Cl |
| $C_3H_7$ | Cl |
| $(C_3H_7)_2N$— | $(C_3H_7)_2N$— |
| $C_2H_5O$— | decylO— |
| $C_6H_5CH_2O$— | $C_4H_9$— |

EXAMPLE 3

1.0 gm. of 3-diethylamino-4-n-propylaniline is dissolved in a mixture of 5.5 ml. of isopropanol and 4.5 ml. of 1.09 N isopropanolic hydrogen chloride, and to this solution is added 0.864 gm. of dimethyl hydroxymethylenemalonate. The mixture is cooled to about 20° C. and stirred for 1 hour. At the end of this time the solid product was removed by filtration and washed with 2× 3ml. of isopropanol and 5 ml. of ether. There is obtained 1.4 gm. of crystalline methyl α-carbomethoxy-β-(3-diethylamino-4-n-propyl-anilino)acrylate hydrochloride.

EXAMPLE 4

2.0 gm. of dimethyl hyroxymethylenemalonate sodium salt is added to 20 ml. of 2 N methanolic hydrogen chloride and the resulting mixture allowed to stand for 20 hours at 25° C. The methanol is then removed by concentration in vacuo. 10 ml. of water is added to the residue and the resulting mixture extracted with 10 ml. of diethyl ether. The ether extract is evaporated to dryness in vacuo to afford a residue consisting of 1.9 gm. of substantially pure dimethyl methoxymethylenemalonate.

When this process is repeated using ethanolic hydrogen chloride and using diethyl hydroxymethylenemalonate potassium salt, there is obtained diethyl ethoxymethylenemalonate.

The substituted anilines employed as starting materials in one aspect of this invention are in general known compounds. The anilines having loweralkyl and/or dialkylamino radicals at the 3- and 4-positions of the aniline reactant may be obtained as described in the pending U.S. patent application Ser. No. 619,546, now Pat. No. 3,377,352 of our associates Robert Clark, Edward Rogers and Arthur Patchett. Other aniline reactants not specifically described in the literature may be prepared by methods known in the art for analogous compounds.

The diloweralkyl hydroxymethylenemalonates (or salts thereof) which are also used in the processes of this invention are obtained from diloweralkylmalonate and loweralkyl formate, as exemplified below for synthesis of dimethyl hydroxymethylenemalonate:

23 grams (1.0 m.) of sodium is added in small portions to 500 ml. of methanol over a period of 20 minutes. Any refluxing that occurs is allowed to subside before making successive additions of sodium. The sodium methoxide solution thus obtained is cooled to 55–60° C., and 114 ml. (1.0 m.) of methyl malonate is added. 125 ml. (2.0 m.) of cold methyl formate is finally added (this addition reducing the temperature to 35–40° C.). The resulting mixture is stirred at 50° C. for 6 hours during which time a thick slurry forms, the solid consisting of methyl hydroxymethylenemalonate sodium salt. During the reaction period carbon monoxide equivalent to 0.3 m. of methyl formate is evolved.

The thick slurry is cooled to 20° C. and filtered. The solid product is washed with 100 ml. of methanol and dried in vacuo at 60–70° C. for 3 hours. There is obtained 133 g. (73%) of methyl hydroxymethylenemalonate sodium salt, M.P. 260–265° C. (dec.).

18.2 grams (0.1 m.) of methyl hydroxymethylenemalonate sodium salt is dissolved in 90 ml. of water and 17 ml. (0.2 m.) of concentrated hydrochloric acid added to the solution. Methyl hydroxymethylenemalonate separates as an oil which crystallizes rapidly. The resulting mixture is cooled to about 5° C. and the solid product filtered, washed with 10 ml. of ice water and dried in vacuo at 25° C. There is obtained 12.6 g. (79%) of methyl hydroxymethylenemalonate, M.P. 41–44° C.

This synthesis of diloweralkyl hydroxymethylenemalonates is not a part of the present invention but is rather the invention of Roger Tull, Edward Tristram and Avery Rosegay and is the subject of a patent application filed by them.

Any departure from the above description which conforms to the present invention is intended to be included within the scope of the claims.

What is claimed is:

1. The method for preparing diloweralkyl alkoxymethylenemalonate that comprises treating diloweralkyl hydroxymethylenemalonate or a metal salt thereof with a loweralkanol in the presence of a mineral acid.

2. The process of claim 1 wherein dimethyl methoxymethylenemalonate is obtained by treating dimethyl hydroxymethylenemalonate sodium salt with methanol in the present of hydrogen chloride.

3. The process for preparing loweralkyl a-carboalkoxy-β-(3-dialkylamino - 4 - alkyl-anilino)-acrylate that comprises reacting together diloweralkyl hydroxymethylenemalonate and 3-dialkylamino-4-n-propyl-aniline in a loweralkanol and in the presence of an amount of mineral acid in excess of that required for neutralization of the aniline reactant.

4. The process of claim 3 wherein the acid is hydrogen chloride.

5. The process of claim 3 wherein methyl α-carbomethoxy - β-(3-diethylamino-4-n-propyl-anilino)-acrylate is obtained by reaction of dimethyl hydroxymethylenemalonate and 3-diethylamino-4-n-propyl-aniline in methanolic hydrogen chloride, the amount of acid being in excess of that required for neutralization of the aniline reactant.

6. In the process for preparing a loweralkyl α-carboalkoxy-β-anilino-acrylate from an aniline compound and a diloweralkyl oxymethylenemalonate, the improvement that comprises reacting the aniline compound with loweralkyl hydroxymethylenemalonate in a loweralkanol and in the presence of an amount of mineral acid in excess of that required for neutralization of the aniline.

References Cited

UNITED STATES PATENTS 3,414,576    12/1968    Cairns et al. _____ 260–471

LORRAINE A. WEINBERGER, Primary Examiner

L. A. THAXTON, Assistant Examiner

U.S. Cl. X.R.

260—287, 484